US010335874B2

(12) United States Patent
Iwata (10) Patent No.: US 10,335,874 B2
(45) Date of Patent: Jul. 2, 2019

(54) RECIPROCATING TOOL (71) Applicant: HITACHI KOKI CO., LTD., Tokyo (JP)

(72) Inventor: Satoshi Iwata, Ibaraki (JP)

(73) Assignee: KOKI HOLDINGS CO., LTD., Tokyo (JP)

( * ) Notice: Subject to any disclaimer, the term of this patent is extended or adjusted under 35 U.S.C. 154(b) by 0 days.

(21) Appl. No.: 15/312,217

(22) PCT Filed: May 15, 2015

(86) PCT No.: PCT/JP2015/064053
§ 371 (c)(1),
(2) Date: Nov. 18, 2016

(87) PCT Pub. No.: WO2015/178314
PCT Pub. Date: Nov. 26, 2015

(65) Prior Publication Data
US 2017/0225245 A1  Aug. 10, 2017

(30) Foreign Application Priority Data
May 23, 2014 (JP) ................. 2014-107602

(51) Int. Cl.
*B23D 49/16* (2006.01)
*B23D 51/10* (2006.01)
(Continued)

(52) U.S. Cl.
CPC ........... *B23D 49/162* (2013.01); *B23D 49/16* (2013.01); *B23D 51/10* (2013.01); *B23D 51/16* (2013.01); *B25F 5/006* (2013.01)

(58) Field of Classification Search
CPC .............. B23D 49/162–167; B23D 51/10
USPC ................................... 30/392–394
See application file for complete search history.

(56) References Cited

U.S. PATENT DOCUMENTS 2,816,583 A * 12/1957 Hill ............... B23D 49/162
30/392
2,839,101 A * 6/1958 Bork ............... B23D 49/162
30/392

(Continued)

FOREIGN PATENT DOCUMENTS

BE  401 823 A       4/1934
CH      657798 A5 *  9/1986 ........... B23D 49/165
(Continued)

OTHER PUBLICATIONS

Extended European Search Report issued in corresponding EP Application No. 15795970.1, dated Nov. 29, 2017.
(Continued)

*Primary Examiner* — Jason Daniel Prone
(74) *Attorney, Agent, or Firm* — McDermott Will & Emery LLP (57) ABSTRACT A reciprocating tool with a reduced number of parts is provided. A jigsaw reciprocates a saw blade in a direction along an axis with the power of an electric motor. The jigsaw includes a housing accommodating the electric motor, a guide member fixed to the housing and provided along the axis, a connector member sandwiching the guide member and reciprocating when the power of the electric motor is transmitted thereto, and a plunger attached to the connector member and holding the saw blade.

7 Claims, 7 Drawing Sheets (51) Int. Cl.
*B23D 51/16* (2006.01)
*B25F 5/00* (2006.01)

(56) References Cited

U.S. PATENT DOCUMENTS

| | | | | |
|---|---|---|---|---|
| 3,204,470 A * | 9/1965 | Brucker | B23D 49/165 30/392 |
| 3,206,989 A * | 9/1965 | Enders | B23D 49/165 30/392 |
| 3,236,111 A * | 2/1966 | Naslund | B23D 49/165 30/392 |
| 3,404,574 A * | 10/1968 | Stelljes | B23D 49/162 30/392 |
| 3,542,097 A * | 11/1970 | Dudek | B23D 49/167 30/392 |
| 3,695,344 A * | 10/1972 | Schnizler, Jr. | B23D 49/162 30/392 |
| 3,795,980 A * | 3/1974 | Batson | B23D 49/167 30/394 |
| 3,832,772 A * | 9/1974 | Sumida | B23D 49/162 30/392 |
| 3,863,342 A * | 2/1975 | Griffies | B23D 49/162 30/393 |
| 3,890,708 A * | 6/1975 | Bauer | B23D 49/08 30/393 |
| 3,942,251 A * | 3/1976 | Griffies | B23D 49/162 30/394 |
| 3,971,132 A * | 7/1976 | Griffies | B23D 49/162 30/393 |
| 4,031,763 A * | 6/1977 | Eisenberg | B23D 51/16 30/392 |
| 4,055,893 A * | 11/1977 | Saxe | B23D 49/167 30/392 |
| 4,137,632 A * | 2/1979 | Pfanzer | B23D 49/162 30/393 |
| 4,262,420 A * | 4/1981 | Nalley | B23D 49/162 30/392 |
| 4,262,421 A * | 4/1981 | Bergler | B23D 49/165 30/393 |
| 4,272,996 A * | 6/1981 | Sauerwein | B23D 49/162 30/394 |
| 4,283,855 A * | 8/1981 | Nalley | B23D 51/16 30/394 |
| 4,351,112 A * | 9/1982 | Nalley | B23D 49/162 30/392 |
| 4,512,078 A * | 4/1985 | Pfanzer | B23D 49/165 30/393 |
| 4,528,753 A * | 7/1985 | Kuhlmann | B23D 51/10 30/392 |
| 4,545,123 A * | 10/1985 | Hartmann | B23D 49/165 30/393 |
| 4,628,605 A * | 12/1986 | Clowers | B23D 49/165 30/393 |
| 4,693,009 A * | 9/1987 | Bone | B23D 49/167 30/392 |
| 4,836,069 A * | 6/1989 | Tran Dinh | B23D 49/08 30/392 |
| 4,841,643 A * | 6/1989 | Colella | B23D 51/02 30/393 |
| 5,170,564 A * | 12/1992 | Kaiser | B23D 49/165 30/393 |
| 5,205,043 A * | 4/1993 | Batt | B23D 49/165 30/393 |
| 5,566,768 A * | 10/1996 | Bourke | B23D 49/162 30/392 |
| 5,765,463 A * | 6/1998 | Okubo | B23D 51/10 30/392 |
| 5,964,039 A * | 10/1999 | Mizoguchi | B23D 51/10 30/393 |
| 6,047,477 A * | 4/2000 | Di Nicolantonio | B23D 51/10 30/392 |
| 6,453,565 B1 * | 9/2002 | Phillips | B23D 51/10 30/392 |
| 6,550,147 B1 * | 4/2003 | Fishlock | B23D 49/11 30/392 |
| 6,625,892 B2 * | 9/2003 | Takahashi | B23D 49/165 30/392 |
| 6,769,188 B2 * | 8/2004 | Dorner | B23D 51/16 30/392 |
| 7,047,651 B2 * | 5/2006 | Delfini | B23D 51/025 30/394 |
| 7,065,884 B2 * | 6/2006 | Tam | B23D 49/167 30/392 |
| 7,254,892 B2 * | 8/2007 | Walker | B23D 49/165 30/392 |
| 7,328,514 B2 * | 2/2008 | Park | B23D 49/165 30/392 |
| 7,350,302 B2 * | 4/2008 | Imai | B23D 49/165 30/393 |
| 7,506,447 B2 * | 3/2009 | Wheeler | B23D 49/162 30/392 |
| 7,665,216 B2 * | 2/2010 | Yasheng | B23D 51/10 30/392 |
| 8,201,337 B2 * | 6/2012 | Tam | B23D 49/167 30/392 |
| 8,578,615 B2 * | 11/2013 | Baskar | B23D 51/03 30/392 |
| 9,038,278 B2 * | 5/2015 | Kani | B23D 51/10 30/394 |
| 2002/0095798 A1 * | 7/2002 | Ellis | B23D 49/167 30/392 |
| 2003/0070307 A1 * | 4/2003 | Walker | B23D 51/16 30/393 |
| 2003/0140507 A1 | 7/2003 | Lagaly et al. | |
| 2004/0045425 A1 * | 3/2004 | Houben | B23D 51/10 30/392 |
| 2004/0117993 A1 * | 6/2004 | Armstrong | B23D 49/165 30/392 |
| 2004/0237678 A1 | 12/2004 | Lagaly et al. | |
| 2005/0257385 A1 * | 11/2005 | Walker | B23D 49/16 30/392 |
| 2006/0174495 A1 * | 8/2006 | Jumior | B23D 51/10 30/392 |
| 2006/0288592 A1 * | 12/2006 | Roberts | B23D 49/165 30/392 |
| 2007/0289148 A1 * | 12/2007 | Zhang | B23D 49/167 30/392 |
| 2009/0077820 A1 * | 3/2009 | Gibbons | B23D 49/165 30/393 |
| 2011/0131820 A1 | 6/2011 | Kaiser et al. | |
| 2011/0154921 A1 | 6/2011 | Duan | |
| 2011/0239473 A1 | 10/2011 | Zurkirchen | |
| 2011/0265335 A1 * | 11/2011 | Bantle | B23D 49/165 30/394 |
| 2012/0030955 A1 * | 2/2012 | Kaiser | B23D 49/167 30/393 |
| 2012/0192440 A1 * | 8/2012 | Jerabek | B23D 49/165 30/393 |
| 2013/0206437 A1 | 8/2013 | Saitou | |
| 2015/0033564 A1 * | 2/2015 | Kobori | B23D 51/16 30/392 |
| 2016/0243633 A1 * | 8/2016 | Terashima | B23D 51/02 30/392 |

FOREIGN PATENT DOCUMENTS

| | | | |
|---|---|---|---|
| DE | 3408847 A1 * | 11/1985 | B23D 49/165 |
| EP | 2 295 179 A1 | 3/2011 | |
| JP | H02-066915 U1 | 5/1990 | |
| JP | H05-031901 U | 4/1993 | |
| JP | 2012-076170 A | 4/2012 | |

OTHER PUBLICATIONS

Search Report issued in corresponding International Application No. PCT/JP2015/064053, dated Jul. 14, 2015.

(56) References Cited

OTHER PUBLICATIONS

Office Action issued in corresponding Chinese Patent Application No. 201580027406.1, dated Feb. 24, 2018.

* cited by examiner

RECIPROCATING TOOL

CROSS REFERENCE

This application is the U.S. National Phase under 35 U.S.C. § 371 of International Application No. PCT/JP2015/064053, filed on May 15, 2015, which claims the benefit of Japanese Application No. 2014-107602, filed on May 23, 2015, the entire contents of each are hereby incorporated by reference.

TECHNICAL FIELD

The present invention relates to a reciprocating tool that reciprocates a tip tool with the power of a motor.

BACKGROUND ART

Reciprocating tools that reciprocate a tip tool with the power of a motor to process an object have been known, an example of which is described in Patent Document 1. The reciprocating tool described in Patent Document 1 has a housing that accommodates a motor, a power transmission member that revolves around a center line of rotation with the rotational force of the motor, a plunger holder provided inside the housing to be rockable about a support pin, two bearings attached to the plunger holder, a plunger that is supported by the two bearings to be movable along an axis and that holds a tip tool, and a connector portion fixed to the plunger. Also provided in the housing is a rocking mechanism that causes the plunger holder to rock about the support pin.

RELATED ART DOCUMENTS

Patent Documents

Patent Document 1: Japanese Utility Model Laid-Open No. H5-31901

SUMMARY OF THE INVENTION

Problems to be Solved by the Invention

However, the reciprocating tool described in Patent Document 1 needs to have a connector member that rockably supports the plunger and the tip tool, and bearings that support the plunger to be movable in a direction along the axis. This configuration increases the number of parts.

It is an aim of the present invention to provide a reciprocating tool with a reduced number of parts.

Means for Solving the Problems

A reciprocating tool according to one embodiment is a reciprocating tool that reciprocates a tip tool in a first direction with the power of a motor, the reciprocating tool including a housing accommodating the motor, a guide member fixed to the housing and provided along the first direction, a connector member that is provided while sandwiching the guide member and that reciprocates in the first direction when the power of the motor is transmitted to the connector member, and a plunger attached to the connector member and holding the tip tool.

Effects of the Invention

According to the present invention, the connector member serves as both a mechanism for rockably supporting the plunger and a mechanism for movably supporting the plunger in a direction along an axis. The number of parts can thus be reduced.

DETAILED DESCRIPTION OF PREFERRED EMBODIMENTS

An embodiment in which a reciprocating tool according one aspect of the present invention is applied to a jigsaw will be explained with reference to FIGS. 1 to 4. An object 10 to be cut by a jigsaw 11 includes wood, mild steel plates, and stainless steel. The jigsaw 11 has a housing 12, and the housing 12 has a motor accommodating portion 13, a gear case 14 connected to the motor accommodating portion 13, and a handle portion 15 that connects the motor accommodating portion 13 and the gear case 14. The gear case 14 has an opening, and a cover 16 that covers the opening is provided.

Inside the motor accommodating portion 13, an electric motor 17 is provided. On an output shaft 18 of the electric motor 17, a pinion 19 is provided. A support shaft 20 that is parallel to the output shaft 18 is fixed to the gear case 14 and the support shaft 20 rotatably supports a gear 21. The gear 21 meshes with the pinion 19. An eccentric portion 22 is provided integral with the gear 21. The eccentric portion 22 protrudes from a side face of the gear 21 in a direction along a center line of rotation A1 of the gear 21. The eccentric portion 22 has a circular outer perimeter shape and the center of the eccentric portion 22 is offset from the center line of rotation A1.

A balance weight 23 is attached to an outer perimeter of the eccentric portion 22. The balance weight 23 is integrally formed from metal. The balance weight 23 is provided with a slot 24 that extends along the center line of rotation A1 through the balance weight 23, and the eccentric portion 22 is disposed inside the slot 24. A long axis of the slot 24 extends along a horizontal direction. The eccentric portion 22 is movable in the horizontal direction inside the slot 24. The balance weight 23 is also provided with a linear slit 25 that extends in an up and down direction. A guide pin 26 is fixed to the housing 12 and is disposed inside the slit 25. The guide pin 26 is movable inside the slit 25 and regulates the direction of movement of the balance weight 23 to an up and down direction in FIGS. 2 to 4.

A rotatable body 27 is fixed to the eccentric portion 22 with a screw. The rotatable body 27 is integrally formed from steel. A support shaft 28 is attached to the rotatable body 27. The support shaft 28 is disposed inside the cover 16. The support shaft 28 is integrally formed from a cylindrically shaped piece of steel, and a center line B1 of the support shaft 28 is offset from the center line of rotation A1 of the gear 21. A connecting piece 30 is attached to an outer peripheral surface of the support shaft 28 with a needle bearing 29 interposed therebetween. The connecting piece 30 is integrally formed into a cylindrical shape from steel.

A plunger 31 is provided while extending from inside the cover 16 to outside the cover 16. The plunger 31 is a tubular member and a saw blade 32 is attached to an end thereof in a direction along an axis C1 through the center of the plunger 31. The saw blade 32 has multiple teeth formed along the axis C1, on a side edge opposite to the side of an operator that manually holds the handle portion 15. The plunger 31 and the saw blade 32 are disposed side by side in the direction along the axis C1.

Figure 5A:
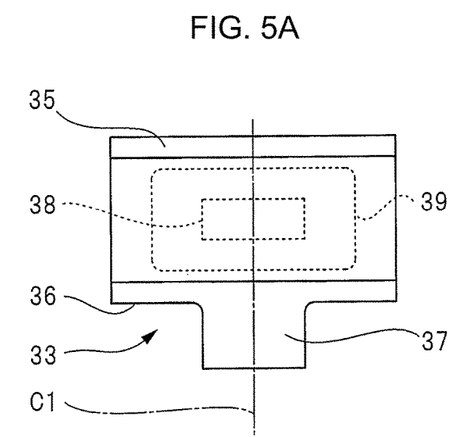
FIG. 5(A) is a left side view of a connector member shown in FIGS. 2 to 4.
Figure 5B:
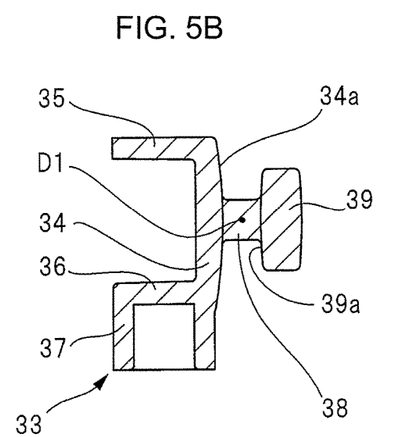
FIG. 5(B) is a front cross-sectional view of the connector member shown in FIGS. 2 to 4.
Figure 6:
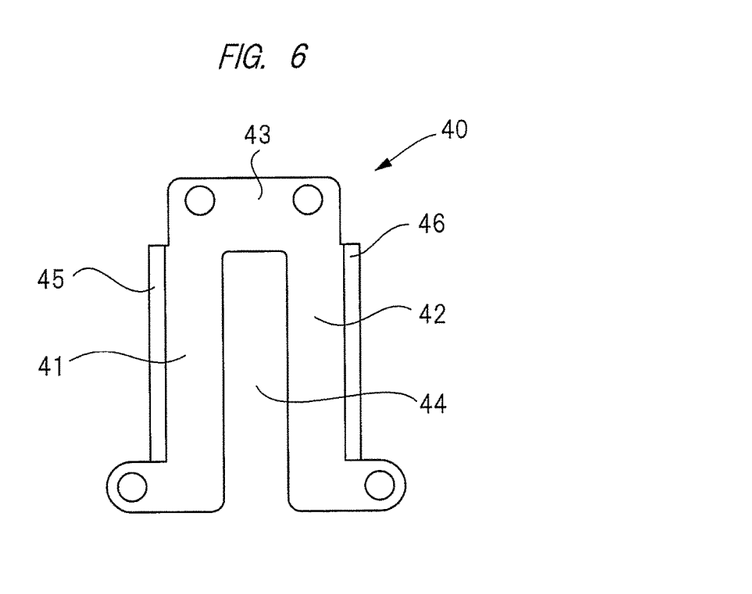
FIG. 6 is a left side view of a guide member shown in FIGS. 2 to 4.

A connector member 33 is provided inside the cover 16. The connector member 33 drivably connects the support shaft 28 and the plunger 31. The connector member 33 is integrally foamed from steel. As shown in FIGS. 5(A) and 5(B), the connector member 33 has a first clamping portion 34, guide plates 35, 36 provided continuous with the first clamping portion 34, and a connecting tube 37 that is continuous with the guide plate 36. The first clamping portion 34 is a base plate in the shape of a quadrilateral, for example, a rectangle, and from two parallel side edges of the first clamping portion 34, the guide plates 35, 36 extend in a thickness direction of the first clamping portion 34.

The guide plates 35, 36 are disposed in different positions in the direction along the axis C1. The plunger 31 is fitted at its end in the direction along the axis C1 into the connecting tube 37. The connector member 33 is a separate member from the plunger 31 and is fixed to an upper end of the plunger 31 in the direction in which gravity acts. The connecting piece 30 is movably disposed between the guide plate 35 and the guide plate 36. That is, the connecting piece 30 is movable in a direction intersecting with the axis C1.

Within a plane that includes the axis C1 and the center line B1, a connecting portion 38 is provided while protruding from the first clamping portion 34 and a second clamping portion 39 is provided continuous with the connecting portion 38. The connecting portion 38 protrudes in a direction opposite to the direction in which the guide plates 35, 36 extend with respect to the first clamping portion 34. The outer perimeter of the connecting portion 38 is in the shape of a quadrilateral, for example, a rectangle. The outer perimeter of the second clamping portion 39 is in the shape of a quadrilateral, for example, a rectangle. In the direction along the axis C1, the second clamping portion 39 has a length that is longer than the length of the connecting portion 38, and in a direction at right angles to the axis C1, the second clamping portion 39 has a length that is longer than the length of the connecting portion 38.

A surface 34a of the first clamping portion 34 on a side that is provided with the connecting portion 38 curves arcuately within the plane that includes the axis C1 and the center line B1. Specifically, the surface 34a bulges toward the second clamping portion 39. A surface 39a of the second clamping portion 39 on a side that is continuous with the connecting portion 38 curves arcuately within the plane that includes the axis C1 and the center line B1. Specifically, the surface 39a bulges toward the first clamping portion 34.

A guide member 40 is provided inside the housing 12. The guide member 40 is fixed to the cover 16. As shown in FIGS. 6 and 7(A) to 7(C), the guide member 40 includes side walls 41, 42, a connecting wall 43 that connects the side wall 41 and the side wall 42, and a guide groove 44 provided between the side wall 41 and the side wall 42. In addition, a rail 45 is provided on the side wall 41 and a rail 46 is provided on the side wall 42. The rail 45 and the rail 46 are parallel to one another, and the guide groove 44 is provided along the length direction of the rails 45, 46.

Figure 7A:
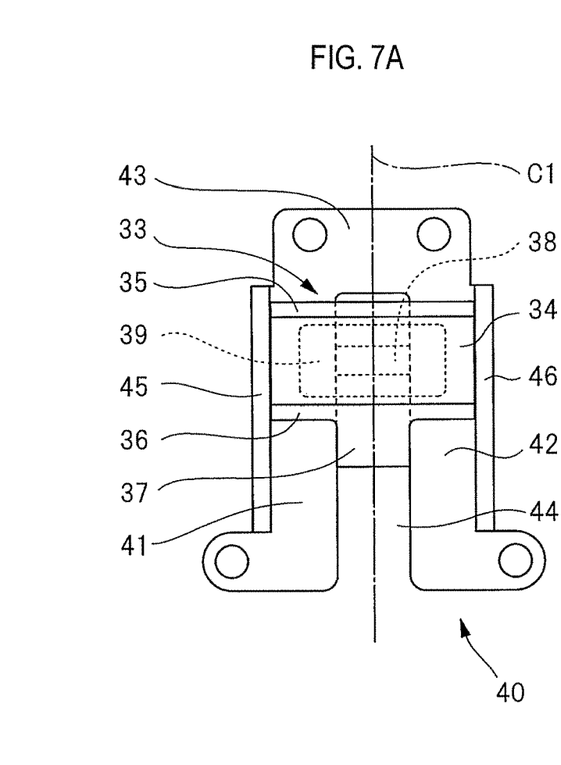
FIG. 7(A) is a left side view of the guide member and the connector member shown in FIGS. 2 to 4.
Figure 7B:
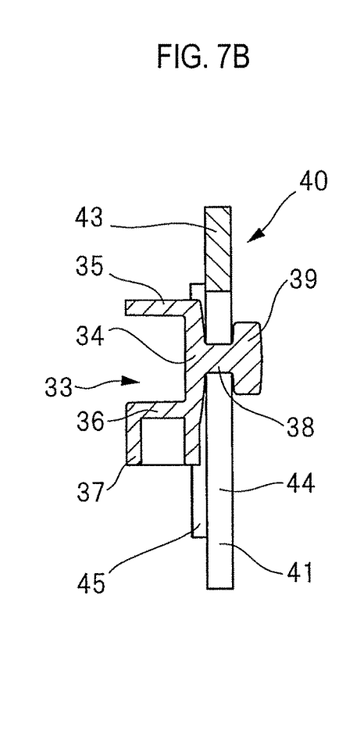
FIG. 7(B) is a front cross-sectional view of the guide member and the connector member shown in FIGS. 2 to 4.
Figure 7C:
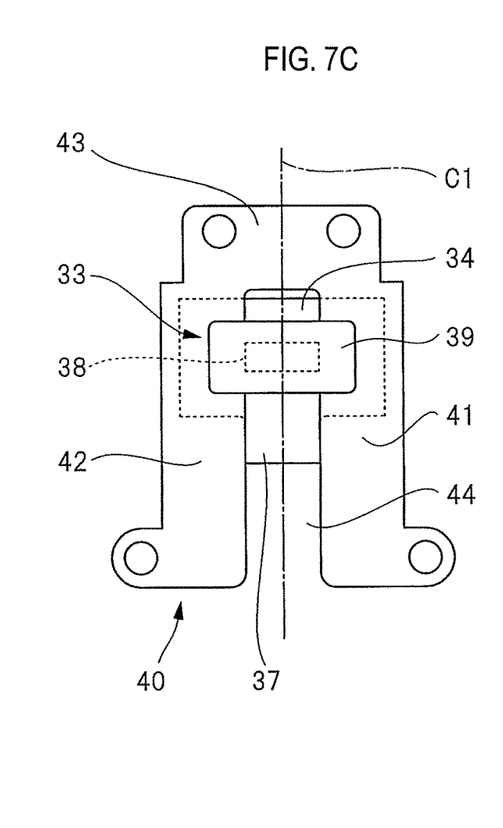
FIG. 7(C) is a right side view of the guide member and the connector member shown in FIGS. 2 to 4.

The guide member 40 is an element that regulates the direction of movement of the connector member 33, and the connecting portion 38 of the connector member 33 is disposed in the guide groove 44. In FIG. 7(A), which is a left side view of the guide member 40 and the connector member 33, the connector member 33 is disposed between the rail 45 and the rail 46. The guide member 40 is disposed between the first clamping portion 34 and the second clamping portion 39 as seen from the front of the connector member 33 and the guide member 40. That is, the first clamping portion 34 and the second clamping portion 39 sandwich the guide member 40 therebetween. The side walls 41, 42 have a thickness that is less than a gap between the first clamping portion 34 and the second clamping portion 39 as seen from the front of the connector member 33 and the guide member 40. Movement of the connector member 33 is regulated in the direction intersecting with the axis C1 due to the connector member 33 being in contact with the rails 45 and 46 and the connector member 33 is capable of moving in the direction along the axis C1 with respect to the guide member 40.

Figure 1:
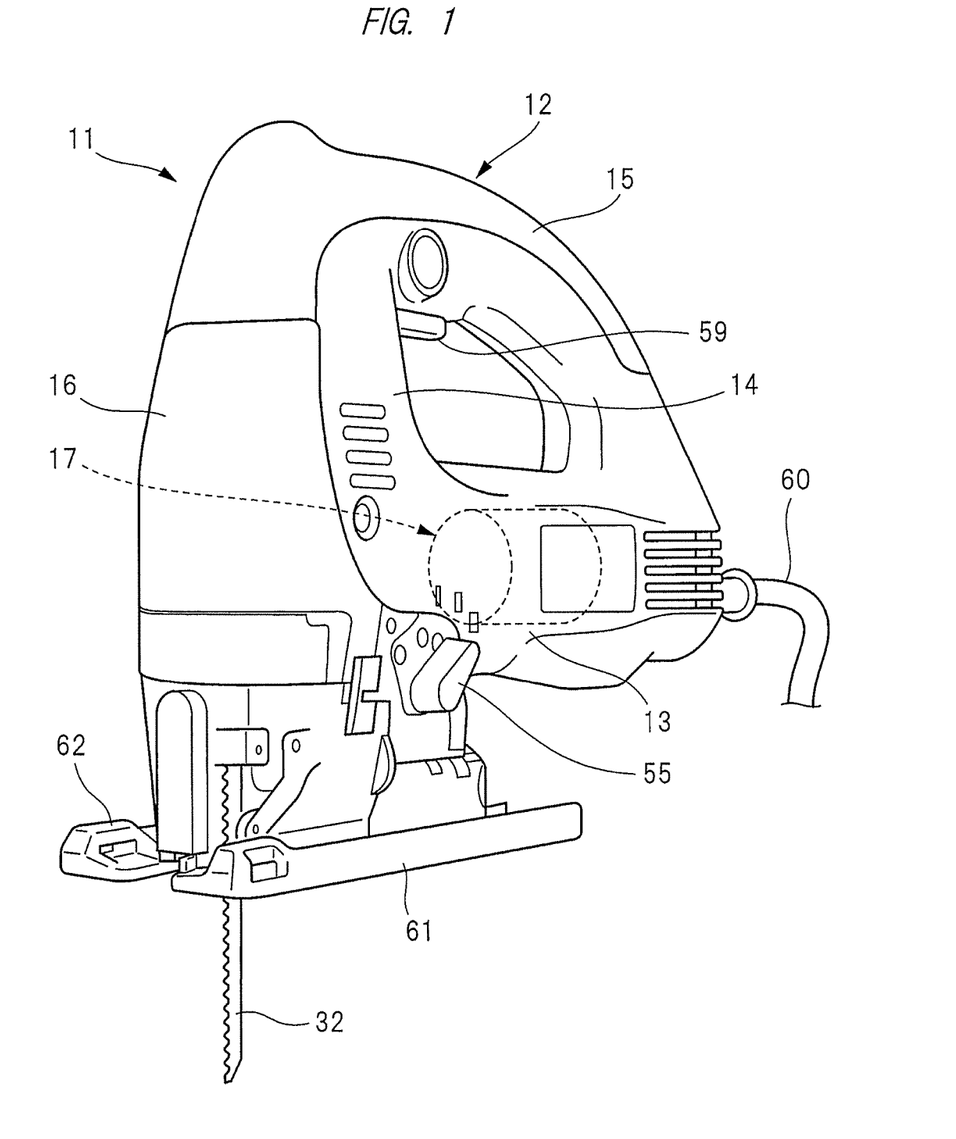
FIG. 1 is a perspective view of a jigsaw to which a reciprocating tool according to the present invention is applied.
Figure 2:
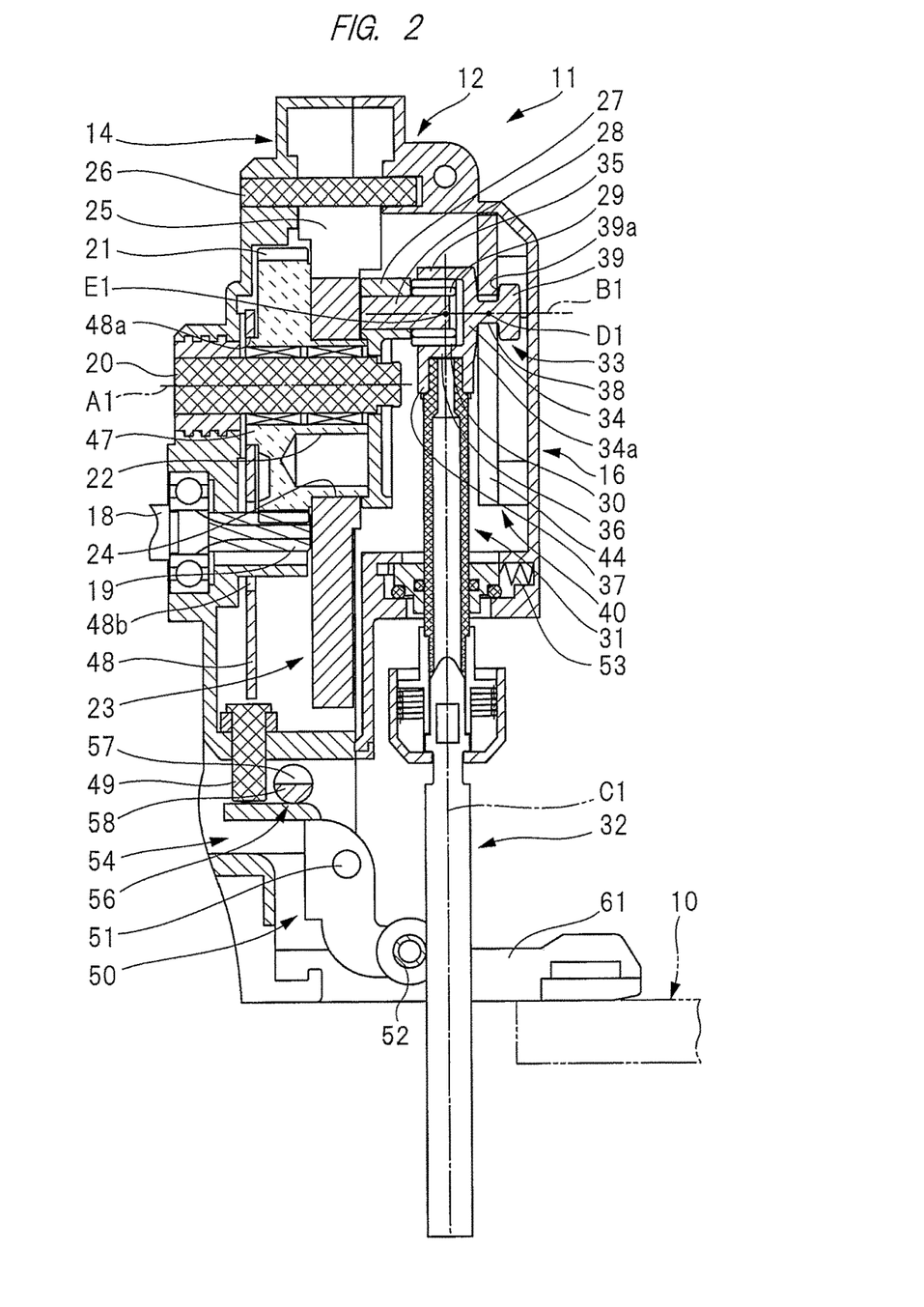
FIG. 2 is a partial front cross-sectional view of the jigsaw shown in FIG. 1.
Figure 3:
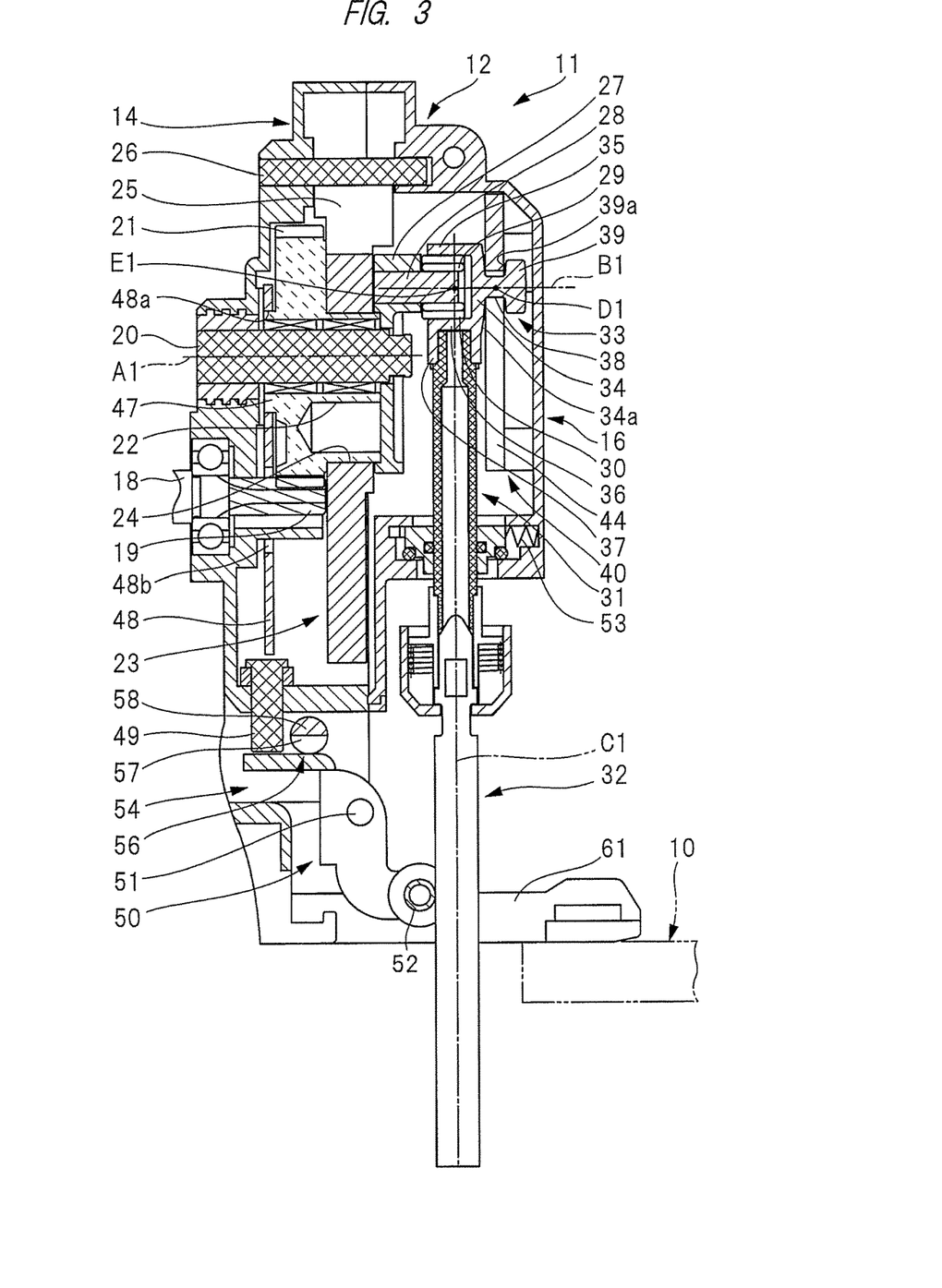
FIG. 3 is a partial front cross-sectional view of the jigsaw shown in FIG. 1.
Figure 4:
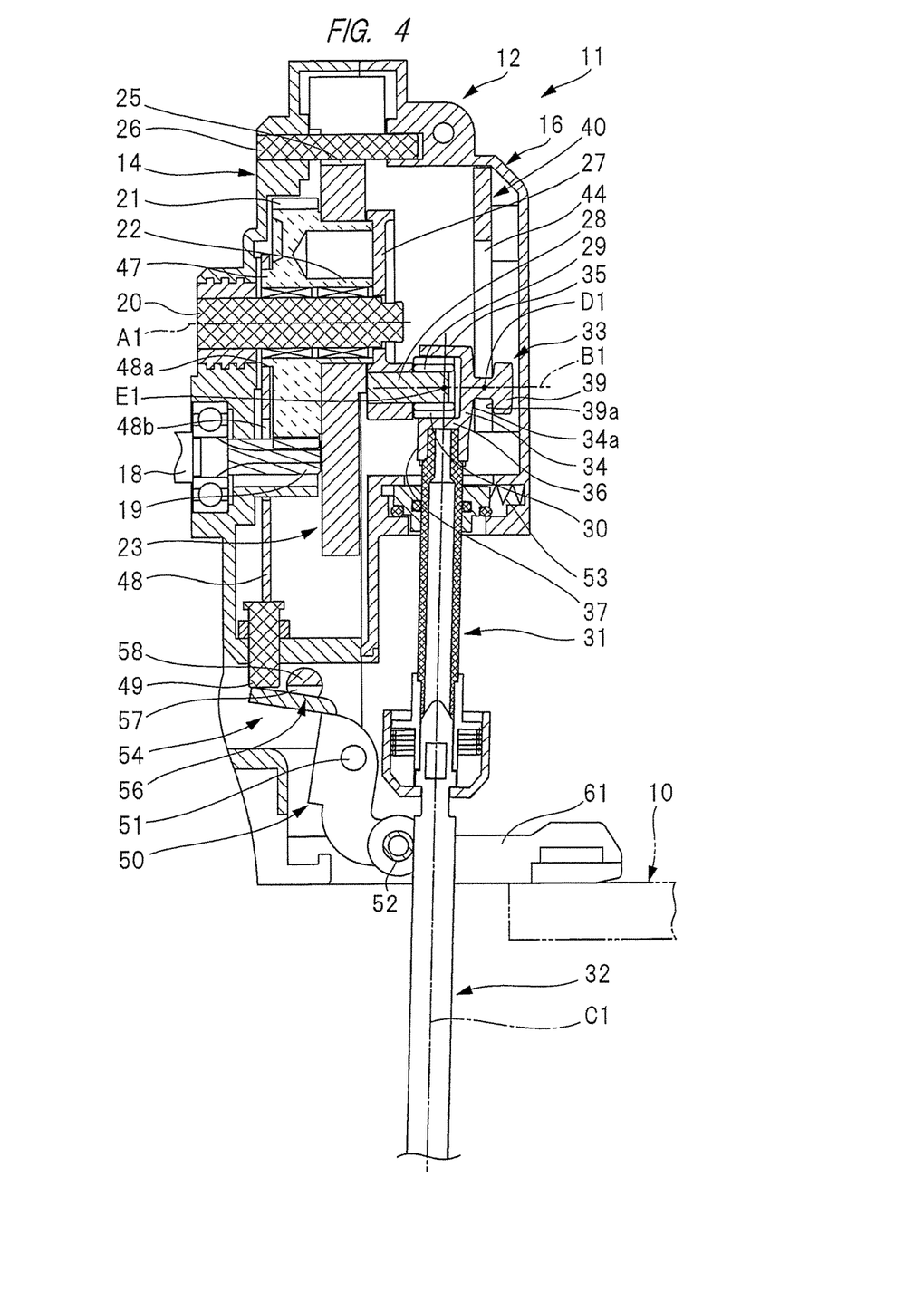
FIG. 4 is a partial front cross-sectional view of the jigsaw shown in FIG. 1.

The connector member 33 is rockable about a fulcrum point D1 of the connecting portion 38 within a predetermined angular range as seen from the front of the connector member 33 and the guide member 40. The fulcrum point D1 is disposed at a different location from an intersection point E1 of the axis C1 and the center line B1. In plan view along a direction in which the plunger 31 and the connector member 33 rock, that is, in FIGS. 2, 3 and 5(B), the fulcrum point D1 is positioned between the surface 34a and the surface 39a. Furthermore, as shown in FIGS. 2 to 4, within a plane along the direction in which the plunger 31 and the connector member 33 rock, the connecting portion 38 is disposed outside a projected range of the plunger 31 in the direction along the axis C1.

The gear 21 is provided with an eccentric shaft 47. The eccentric shaft 47 is offset from the center line of rotation A1. A cam plate 48 is attached to the eccentric shaft 47. The cam plate 48 is provided with a slot 48a and the eccentric shaft 47 is movably disposed in the slot 48a. The cam plate 48 is provided with a linear slit 48b that extends in the up and down direction in FIGS. 2 to 4. The cam plate 48 is movable in the up and down direction in FIGS. 2 to 4 with the output shaft 18 being disposed in the slit 48b.

A contactor 49 is attached to the gear case 14. The contactor 49 is movable in the up and down direction in FIGS. 2 to 4 with respect to the gear case 14. The cam plate 48 has an end portion that comes into with the contactor 49.

A rocking arm 50 is attached to the gear case 14. The rocking arm 50 is rockable clockwise and anticlockwise in FIGS. 2 to 4 about a support shaft 51 within a predetermined angular range. A roller 52 is rotatably attached to one end of the rocking arm 50. The contactor 49 comes into contact with the rocking arm 50. The plunger 31 has the connecting portion 38 biased clockwise in FIGS. 2 to 4 about the fulcrum point D1 by a force of an elastic member 53, and the saw blade 32 attached to the plunger 31 is pushed against the roller 52. The elastic member 53 has a force that biases the plunger 31 in a radial direction. A compression spring may be used as the elastic member 53.

The rocking arm 50 is biased clockwise in FIG. 2 by the push force of the saw blade 32 and the rocking arm 50 comes into contact with the contactor 49 and stops at a predetermined position. Thus, the plunger 31, which is pushed by the force of the elastic member 53, also stops at a predetermined position. The cam plate 48, the contactor 49, the rocking arm 50, the roller 52, the elastic member 53, and other parts compose a trajectory adjustment mechanism 54. The trajectory adjustment mechanism 54 is also called an orbital mechanism and is a mechanism that adjusts a movement trajectory of the saw blade 32, specifically the movement trajectory of a distal end of the saw blade 32 in a front view of the jigsaw 11 in FIGS. 2 to 4.

The gear case 14 is provided with an operational lever 55 and when the operator manipulates the operational lever 55, a regulation shaft 56 moves clockwise or anticlockwise in a predetermined angular range in FIGS. 2 to 4. The regulation shaft 56 includes a cutaway part 57 and a stopper 58. Furthermore, a base 61 is attached to the gear case 14.

The handle portion 15 is provided with a trigger 59. A power cord 60 is connected to a connection point between the handle portion 15 and the motor accommodating portion 13. A control unit is provided inside the housing 12, and the control unit has an electrical circuit that connects the power cord 60 and the electric motor 17, and a switch provided on the electrical circuit. The control unit connects or shuts off the switch based on manipulation of the trigger 59.

An operation of the jigsaw 11 will now be described. The operator connects the power cord 60 to an external power source, then holds the handle portion 15 and pushes the base 61 against the object 10. The base 61 secures the object 10. Manipulation of the trigger 59 causes electric power to be supplied to the electric motor 17 whereby the output shaft 18 rotates in one direction. When the gear 21 rotates about the support shaft 20 with the torque of the output shaft 18, the gear 21 and the rotatable body 27 rotate together. When the rotatable body 27 rotates about the center line of rotation A1, the support shaft 28 revolves around the center line of rotation A1 within a plane perpendicular to the center line B1. A revolving force of the support shaft 28 is then transmitted to the connector member 33 through the connecting piece 30, whereby the connector member 33 and the plunger 31 reciprocate, that is, move up and down in the direction along the axis C1. The saw blade 32 moves up and down together with the plunger 31 and cuts the object 10. In the jigsaw 11, a rotational force of the output shaft 18 of the electric motor 17 is thus converted into a reciprocating force of the plunger 31 and the saw blade 32.

Furthermore, an operation of the trajectory adjustment mechanism 54 will be described. When the stopper of the regulation shaft 56 is between the rocking arm 50 and the cutaway part 57, as shown in FIG. 2, due to the operational position of the operational lever 55, the rocking arm 50 biased by the force of the elastic member 53 comes into contact with the stopper 58 and stops. Thus, the plunger 31 and the saw blade 32 do not rock about the fulcrum point D1 of the connecting portion 38 when the connector member 33 moves up and down along the guide member 40. That is, the movement trajectory of a lower end of the saw blade 32 is straight. In other words, the up and down direction, which is a placement orientation of the guide member 40, is parallel to the axis C1, which is a movement direction of the plunger 31. It is to be noted that when the gear 21 rotates, although the cam plate 48 moves in the up and down direction in FIG. 2, the movement of the cam plate 48 is irrelevant to the rocking of the rocking arm 50.

A case will now be described in which the cutaway part 57 of the regulation shaft 56 is located between the rocking arm 50 and the stopper 58, as shown in FIGS. 3 and 4, due to manipulation of the operational lever 55. The rocking arm 50 does not come into contact with the stopper 58 so that the rocking arm 50 is capable of rotating clockwise and anticlockwise in FIGS. 3 and 4 about the support shaft 51. For example, as shown in FIG. 3, when the plunger 31 and the saw blade 32 are at top dead center, that is, when the support shaft 28 is at top dead center, the cam plate 48 is located at bottom dead center. In this case, the cam plate 48 has an end portion that comes into contact with the contactor 49. Rotation of the rocking arm 50 is thus regulated by the contactor 49, and the plunger 31 and the saw blade 32 are in a state in which the axis C1 is substantially vertical in the same manner as shown in FIG. 2.

Accompanied by the revolution of the support shaft 28, the plunger 31 and the saw blade 32 move down, and in synchronism with this movement, the cam plate 48 moves up as shown in FIG. 4. When the cam plate 48 moves up, the rocking arm 50 rotates clockwise about the support shaft 51 by the force of the elastic member 53. Thus, in a downward stroke of the saw blade 32 from top dead center to bottom dead center, the movement trajectory of the lower end of the saw blade 32 is curved. That is, the saw blade 32 moves down spaced apart from the object 10.

Then, in an upward stroke of the plunger 31 and the saw blade 32, the cam plate 48 moves down, thereby causing the rocking arm 50 to rotate anticlockwise about the support shaft 51, which movement pushes the saw blade 32 against the object 10 to cut the object 10.

Thus, in the jigsaw 11, the connector member 33 rotates about the fulcrum point D1 of the connecting portion 38 within the predetermined angular range when the plunger 31 moves up and down. Furthermore, a gap is formed between the connecting piece 30 and the guide plates 35, 36, and furthermore, an operation of the connector member 33 rotating about the fulcrum point D1 of the connecting portion 38 is performed smoothly. Thus, when the rocking arm 50 rocks about the support shaft 51, the up and down direction, which is the placement orientation of the guide member 40, is not parallel to the movement direction of the plunger 31.

Meanwhile, regardless of the position of the operational lever 55, a rotational force of the gear 21 is transmitted to the balance weight 23 which repeatedly moves up and down. The direction in which the balance weight 23 moves is in an opposite phase to the direction in which the plunger 31 and the saw blade 32 move. That is, when the plunger 31 and the saw blade 32 move up, the balance weight 23 moves down. In contrast, when the plunger 31 and the saw blade 32 move down, the balance weight 23 moves up. Consequently, inertial force from reciprocating movements of the plunger 31 and the saw blade 32 cancels inertial force from reciprocating movements of the balance weight 23, so that vibration of the jigsaw 11 is reduced.

In the jigsaw 11 according to one embodiment, the connector member 33 serves both to movably support the plunger 31 and the saw blade 32 along the guide groove 44 of the guide member 40 and to rockably support the plunger 31 and the saw blade 32. This configuration eliminates the need for separately providing a mechanism for movably supporting the plunger 31 and the saw blade 32 in the up and down direction and a mechanism for rockably and movably supporting the plunger 31 and the saw blade 32. As a result, the number of parts of the jigsaw 11 is reduced, an increase in the size of the jigsaw 11 is avoided, and production cost of the jigsaw 11 is reduced.

Furthermore, the plunger 31 does not move in the direction along the axis C1 with respect to the connector member 33. This eliminates the need for ensuring adequate length of the plunger 31 in the direction along the axis C1 in accordance with the amount of movement of the plunger 31 in the direction along the axis C1. Thus, the dimension of the plunger 31 in the direction along the axis C1 can be shortened.

The connecting portion 38 that includes the fulcrum point D1 about which the plunger 31 rocks is positioned concentric with the support shaft 28. This enables a distance between the fulcrum point D1 and the needle bearing 29 to be short and an amount of the gap between the connecting piece 30 and the guide plates 35, 36 to be small. Thus, vibration that is generated when the plunger 31 reciprocates is reduced.

Figure 8A:
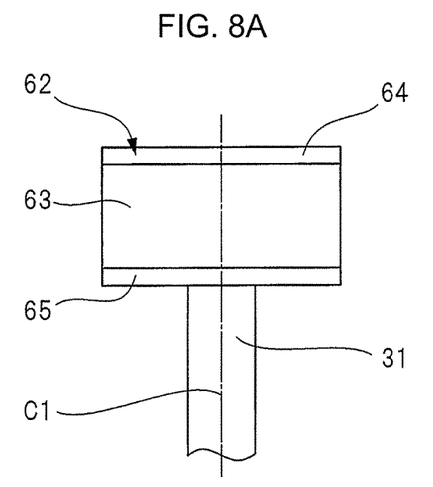
FIG. 8(A) is a left side view showing a variation of the connector member.
Figure 8B:
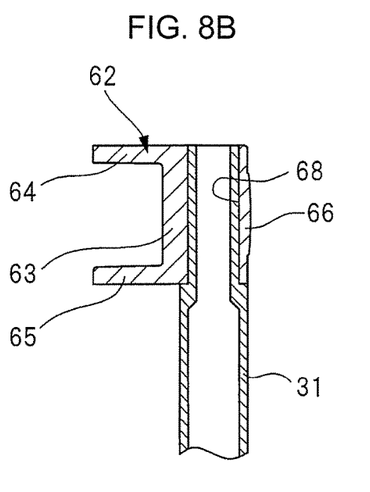
FIG. 8(B) is a front cross-sectional view of the connector member of FIG. 8(A)
Figure 9A:
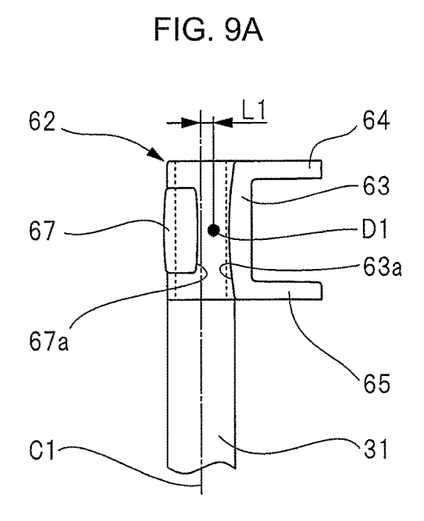
FIG. 9(A) is a rear view showing the variation of the connector member of FIG. 8.
Figure 9B:
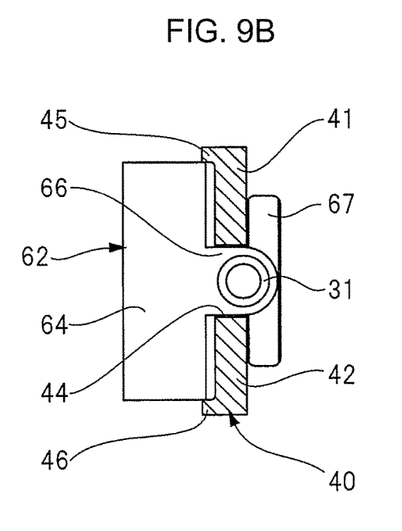
FIG. 9(B) is a cross-sectional plan view showing the variation of the connector member and the guide member.

Another example of the connector member provided in the jigsaw 11 will now be described with reference to FIGS. 8 and 9. A connector member 62 shown in FIGS. 8 and 9 is an element that connects the support shaft 28 and the plunger 31. The connector member 62 is formed from steel. The connector member 62 has a first clamping portion 63 and guide plates 64, 65 provided continuous with the first clamping portion 63. The first clamping portion 63 is a base plate in the shape of a quadrilateral, for example, a rectangle, and from two parallel side edges of the first clamping portion 63, the guide plates 64, 65 extend in a thickness direction of the first clamping portion 63.

As shown in FIG. 8(A), the guide plates 64, 65 are disposed in different positions in the direction along the axis C1. The connecting piece 30 is movably disposed between the guide plate 64 and the guide plate 65. That is, the connecting piece 30 is movable in the direction intersecting with the axis C1.

Within the plane that includes the axis C1 and the center line B1, a connecting portion 66 is provided while protruding from the first clamping portion 63 and a second clamping portion 67 is provided continuous with the connecting portion 66. The connecting portion 66 protrudes in a direction opposite to the direction in which the guide plates 64, 65 extend with respect to the first clamping portion 63. As shown in FIG. 8(B), the connecting portion 66 is provided with a fixing aperture 68 and the plunger 31 has an end that is fitted into the fixing aperture 68. That is, the connector member 62 is a separate member from the plunger 31 and is fixed to the upper end of the plunger 31 in the direction in which gravity acts. Furthermore, as shown in FIG. 9(B), the connector member 62 is provided with a second clamping portion 67 that is continuous with the connecting portion 66.

As shown in FIG. 9(A), a surface 63a of the first clamping portion 63 on a side that is provided with the connecting portion 66 curves arcuately within the plane along the rocking direction of the connector member 33 and the plunger 31. Specifically, the surface 63a runs along the rocking direction of the connector member 33 and the plunger 31 and bulges toward the second clamping portion 67. A surface 67a of the second clamping portion 67 on a side that is continuous with the connecting portion 66 curves arcuately within the plane that includes the axis C1 and the center line B1. Specifically, the surface 67a bulges toward the first clamping portion 63. When the connecting portion 66 is disposed in the guide groove 44 of the guide member 40, the first clamping portion 63 and the second clamping portion 67 sandwich the side walls 41, 42 therebetween. The connector member 62 is movable in an up and down direction along the guide groove 44.

Using the connector member 62 of FIGS. 8 and 9 in the jigsaw 11 of FIGS. 1 to 4 enables the connector member 62 and the plunger 31 to rock about the fulcrum point D1 of the connecting portion 66 within a predetermined angular range.

In jigsaw 11, when the stopper 58 of the regulation shaft 56 is positioned between the cutaway part 57 and the rocking arm 50, as shown in FIG. 2, the rocking arm 50 cannot rock about the support shaft 51. Thus, when the connector member 62 of FIGS. 8 and 9 is used in the jigsaw 11 and a power of the output shaft 18 is transmitted to the connector member 62, the plunger 31 and the saw blade 32 reciprocate up and down but the plunger 31 and the saw blade 32 do not rock about the fulcrum point D1.

In the jigsaw 11, however, when the cutaway part 57 of the regulation shaft 56 is positioned between the stopper 58 and the rocking arm 50, as shown in FIGS. 3 and 4, the plunger 31 and the saw blade 32 are capable of rocking about the fulcrum point D1. Thus, when the connector member 62 of FIGS. 8 and 9 is used in the jigsaw 11 and the power of the output shaft 18 is transmitted to the connector member 62, the plunger 31 and the saw blade 32 reciprocate up and down and the plunger 31 and the saw blade 32 rock about the fulcrum point D1. Consequently, the movement trajectory of the end of the saw blade 32 is oval-shaped. The saw blade 32 is pushed against the object 10 in a direction moving away from the operator in a process of moving in the oval shape and cuts the object 10 when moving up.

The connector member 62 shown in FIGS. 8 and 9 serves as both a mechanism for movably supporting the plunger 31 and the saw blade 32 in the direction along the axis C1 and a mechanism for rocking the plunger 31 and the saw blade 32 about the fulcrum point D1. As a result, the number of parts of the jigsaw 11 is reduced and the same effect as that of the jigsaw 11 using the connector member 33 is obtained.

Furthermore, the plunger 31 does not move in the direction along the axis C1 with respect to the connector member 62. This eliminates the need for ensuring adequate length of the plunger 31 in the direction along the axis C1 in accordance with the amount of movement of the plunger 31 in the direction along the axis C1. Thus, the dimension of the plunger 31 in the direction along the axis C1 can be shortened.

The connecting portion 66 that includes the fulcrum point D1 about which the plunger 31 rocks is positioned concentric with the support shaft 28. This enables the distance between the fulcrum point D1 and the needle bearing 29 to be short and the amount of the gap between the connecting piece 30 and the guide plates 35, 36 to be small. Thus, vibration that is generated when the plunger 31 reciprocates is reduced. When seen from the back of the connector member 62, the connecting portion 66 is positioned concentric with the plunger 31. In other words, within a plane along a direction in which the connector member 62 and the plunger 31 rock, the connecting portion 66 and the fulcrum point D1 are disposed inside the projected range of the plunger 31 in the direction along the axis C1.

Consequently, a distance L1 between the axis C1 and the fulcrum point D1 is relatively short. When a tensile load is applied to the plunger 31 in the direction along the axis C1, a moment about the fulcrum point D1 is applied to the connector member 62. However, since the distance L1 is relatively short, the force with which the surfaces 63a and 67a of the connector member 62 are pushed against the guide member 40 is reduced.

The guide member 40 is fixed to the cover 16, but it is only required that the guide member 40 is fixed inside the housing 12. For example, the guide member 40 may be fixed to the gear case 14.

Corresponding relationships between the configuration of the embodiment and the configuration of the present invention will now be described. The jigsaw 11 corresponds to the reciprocating tool of the present invention, the electric motor 17 corresponds to a motor of the present invention, the saw blade 32 corresponds to a tip tool of the present invention, the support shaft 28 corresponds to a power transmission member of the present invention, and the guide plates 35, 36, 64, 65 correspond to a conversion mechanism of the present invention. The surfaces 34a, 63a correspond to a first curved surface of the present invention, and the surfaces 39a, 67a correspond to a second curved surface of the present invention. The direction along the axis C1 corresponds to a first direction of the present invention, and the direction along the center line B1 corresponds to a second direction of the present invention.

The reciprocating tool according to the present invention is not limited to the above embodiments and various changes may be made without departing from the scope of the invention. For example, the plunger of an embodiment of the present invention holds the tip tool and is a holding member that is capable of reciprocating in a direction along an axis. Additionally, the plunger may be of any structure or shape including an axial member or a tubular member. The present invention also includes a configuration in which the power transmission shaft is movably disposed in a recess formed by the connector member and a configuration in which the recess is provided in the power transmission shaft and a projection formed in the connector member is movably disposed in the recess.

Other than the reciprocating tool in which electric power from a commercial power source is supplied to the electric motor through the power cord, the reciprocating tool according to the present invention includes the reciprocating tool in which electric power of a battery pack attached to the housing is supplied to the electric motor. The battery pack is a battery cell accommodated inside an accommodation case and the battery pack is detachable from the housing.

In the present invention, the motor that generates power to be transmitted to the tip tool includes the electric motor, an engine, a hydraulic motor, and a pneumatic motor. The reciprocating tool according to the present invention includes a saber saw in addition to the jigsaw as a cutting implement for cutting the object with the tip tool. The saber saw has a saw blade reciprocating in a horizontal direction and cuts the object when the saw blade moves in a direction toward the operator. Teeth of the saw blade are directed downward. The saber saw has the base that comes into contact with the object and the base prevents the saber saw from moving toward the object by the reaction force created when drawing the blade to cut the object.

EXPLANATION OF REFERENCE CHARACTERS

17 . . . electric motor, 11 . . . jigsaw, 12 . . . housing, 28 . . . support shaft, 31 . . . plunger, 32 . . . saw blade, 33, 62 . . . connector member, 34, 63 . . . first clamping portion, 34a, 39a, 63a, 67a . . . surface, 35, 36, 64, 65 . . . guide plate, 38, 66 . . . connecting portion, 39, 67 . . . second clamping portion, 40 . . . guide member, 44 . . . guide groove, C1 . . . axis, A1 . . . center line of rotation.

The invention claimed is:

1. A reciprocating tool for moving a tip tool in a reciprocating direction to achieve a cutting action, comprising:
   a housing accommodating:
      a motor;
      a power transmission member, driven by the motor, revolving around a rotation axis crossing the reciprocating direction;
      a plunger extending in the reciprocating direction, one end of the plunger holding the tip tool;
      a connector coupling the power transmission member to another end of the plunger and converting a revolving motion of the power transmission member into a reciprocating motion of the plunger holding the tip tool in the reciprocating direction, the connector having a support member protruding from the connector in a direction perpendicular to the reciprocating direction;
      a guide member fixed to the housing and extending along the reciprocating direction, wherein
   the support member of the connector slidably and rockably engages with the guide member so that the guide member guides a movement of the connector to convert the revolving motion of the power transmission member into the reciprocating motion of the plunger, and
   the connector supports the plunger to allow the plunger to move together with the connector.

2. The reciprocating tool according to claim 1, wherein the plunger has a longitudinal axis which defines the reciprocating direction.

3. The reciprocating tool according to claim 1, wherein the support member protrudes in parallel with the rotation axis and is arranged at a position offset from the rotation axis.

4. The reciprocating tool according to claim 1, wherein the guide member has a guide groove extending along the reciprocating direction,
   the support member of the connector comprises:
      a first clamping portion;
      a second clamping portion facing the first clamping portion; and
      a connection portion connecting the first clamping portion and the second claiming portion, and
   the guide member is disposed between the first clamping portion and the second clamping portion so that the connection portion is disposed in the guide groove, the connection portion being movable within the guide groove.

5. The reciprocating tool according to claim 4, wherein the connector is rockable about the connecting portion which is in the guide groove and sandwiched between first clamping portion and the second clamping portion.

6. The reciprocating tool according to claim 5, wherein the power transmission member includes a support shaft, a center axis of the support shaft extends in parallel with the rotation axis and is offset from the rotation axis, and the support member is coupled with the support shaft through the connector, and the connecting portion of the support member is arranged in the center axis.

7. The reciprocating tool according to claim 5, wherein
the first clamping portion has a first convex-curved surface contacting the guide member and facing the second clamping portion through the guide member,
the second clamping portion has a second convex-curved surface contacting the guide member and facing the second clamping portion through the guide member, and
the connection portion is disposed between the first convex-curved surface and the second convex-curved surface.

* * * * *